(12) United States Patent
Blomgren et al.

(10) Patent No.: US 9,942,409 B1
(45) Date of Patent: Apr. 10, 2018

(54) SYSTEM AND COMPUTER-IMPLEMENTED METHOD FOR TRANSLATING CODING LANGUAGE FOR GRAPHICAL SCRIPTS

(71) Applicant: STATE FARM MUTUAL AUTOMOBILE INSURANCE COMPANY, Bloomington, IL (US)

(72) Inventors: Brian Blomgren, Normal, IL (US); Rick Tackett, Armington, IL (US); Jeffrey R. Clark, Gilbert, AZ (US); Bret Swanson, McKinney, TX (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 0 days.

(21) Appl. No.: 15/642,072

(22) Filed: Jul. 5, 2017

(51) Int. Cl.
| | |
|---|---|
| H04L 12/28 | (2006.01) |
| H04M 7/00 | (2006.01) |
| G06F 17/30 | (2006.01) |
| G06F 9/44 | (2018.01) |
| G06F 9/45 | (2006.01) |
| H04L 12/56 | (2006.01) |
| H04W 40/00 | (2009.01) |

(52) U.S. Cl.
CPC ............ *H04M 7/0021* (2013.01); *G06F 8/34* (2013.01); *G06F 8/38* (2013.01); *G06F 8/51* (2013.01); *G06F 17/30699* (2013.01)

(58) Field of Classification Search
CPC .......... H04M 7/0021; G06F 8/34; G06F 8/38; G06F 8/51; G06F 17/30699; H04L 12/28; H04L 12/56; H04W 40/00

USPC ......................................................... 370/390
See application file for complete search history.

(56) References Cited

U.S. PATENT DOCUMENTS

| | | | |
|---|---|---|---|
| 8,064,443 B2 * | 11/2011 | Scudder ................ | H04L 45/124 370/389 |
| 2015/0347100 A1 * | 12/2015 | Quine ....................... | G06F 8/34 715/763 |
| 2018/0013579 A1 * | 1/2018 | Fairweather ...... | H04L 12/40032 |

* cited by examiner

*Primary Examiner* — Huy C Ho
(74) *Attorney, Agent, or Firm* — Hovey Williams LLP

(57) ABSTRACT

A system and method for translating a coding language for graphical scripts used by a communication routing system into a preferred language. The original script files are received, and translation and validation rules are applied to produce translated script files. The coding language may be translated into an intermediate language which may be translated into the preferred language. A cross-reference and nodes resource is queried to gather associated contextual information for understanding and analyzing the translated script files. The translated script files and the associated contextual information are stored in a database. Thereafter, in response to a query from a user, the database is searched for information of interest from the translated script files, and the information is reported. In one possible application, the technology facilitates performing a path analysis of an individual call flow in which all possible outcomes of a communication are determined from initiation to completion.

20 Claims, 5 Drawing Sheets

őSYSTEM AND COMPUTER-IMPLEMENTED METHOD FOR TRANSLATING CODING LANGUAGE FOR GRAPHICAL SCRIPTS

FIELD OF THE DISCLOSURE

The present disclosure generally relates to systems and methods for translating graphical scripts into more useful forms, and more particularly, to a system and computer-implemented method for translating a coding language for a graphical script, such as are used in communication routing systems, into a more readily readable, searchable, and analyzable language.

BACKGROUND

Businesses often use Contact Centers, such as those provided by, e.g., Cisco, Rockwell, and Nortel, for managing calls from customers, clients, or others. Large businesses may have multiple Contact Center systems in order to better handle large volumes of traffic, and each such system may correspond to a different line of business. Contact Centers typically use scripts to route calls through the systems to the appropriate agents, representatives, or other personnel. In response to prompts, callers input choices which represent nodes in the scripts, and the nodes send the callers to appropriate destinations which are defined in the nodes.

It is sometimes desirable to access and understand information from these scripts. However, the scripts are typically written in a language or format which is not readily readable, searchable, or analyzable. For example, Cisco uses a graphical representation image for its Intelligent Contact Management (ICM) scripts, and the code behind the image is not readily readable and Cisco provides no schema for translating it. Further, there may be thousands of scripts and dozens of different types of nodes, and even allowing for some commonality, translating the code behind each script or node would require many different translation tools. The only relatively accessible information is contained in a Cross-Reference table that lists objects used by the scripts (such as Call Types, Skills, and Other Scripts), but this table contains no information about how any particular node is used, only that it is used. Thus, there is no mechanism for accessing these codes in bulk format, and instead, a user has to open each script and search for any desired information. For example, if a user wanted to determine which of dozens of scripts across multiple Call Center systems invoke a particular destination, the user would have to separately login to each of the multiple systems and individually search all of the of scripts in that system, which could take many hours.

BRIEF SUMMARY

Embodiments of the present technology provide a system and computer-implemented method for translating a coding language for a graphical script, such as are used in communication routing systems, into a more readily readable, searchable, and analyzable language.

In a first aspect, a computer-implemented method may be provided for improving a functioning of a communication routing system by translating a coding language for a plurality of graphical scripts used by the communication routing system into a preferred language, wherein the communication routing system includes one or more databases containing a plurality of original script files. The computer-implemented method may broadly comprise the following actions performed by a computer. The plurality of original script files may be received from the one or more databases, and a set of translation rules may be applied to translate the plurality of original script files and a set of validation rules may be applied for guiding and validating the translation from the coding language into the preferred language to produce a plurality of translated script files. A cross-reference and nodes resource contained in the one or more databases may be queried to gather associated contextual information for understanding and analyzing the plurality of translated script files. The plurality of translated script files and the associated contextual information may be stored in a single database. In response to a query from a user via a user interface, the single database may be searched for information of interest from the plurality of script files, and the information of interest may be reported to the user.

In a second aspect, a system may be configured for improving a functioning of a communication routing system by translating a coding language for a plurality of graphical scripts used by the communication routing system into a preferred language, wherein the communication routing system includes one or more databases containing a plurality of original script files. The system may broadly comprise an electronic memory element, an electronic processing element, and a user interface, which may be configured to perform the following actions. The processing element may receive the plurality of original script files from the one or more databases, and may apply a set of translation rules to translate the plurality of original script files and apply a set of validation rules for guiding and validating the translation from the coding language into the preferred language to produce a plurality of translated script files. The processing element may query a cross-reference and nodes resource contained in the one or more databases to gather associated contextual information for understanding and analyzing the plurality of translated script files. The memory element may store the plurality of translated script files and the associated contextual information in a single database. The user interface may receive a query from a user, search the single database for information of interest from the plurality of script files, and report the information of interest to the user.

Various implementations of any or all of the foregoing aspects may include any one or more of the following additional features. The communication routing system may be an intelligent contact management system used to route telephone calls. The coding language may be translated into an intermediate language, and the intermediate language may be translated into the preferred language. Each original script file may include one or more fields, and the set of validation rules may include a first rule regarding a number of characters in each field, and a second rule regarding a nature of each field. Each original script file may include one or more elements, and each element may have an identification number, and the cross-reference and nodes resource may associate a name with each identification number, and the associated contextual information may include the name and the identification number for each element. In response to a cross-reference query from the user via the user interface, the single database may be searched for and the user interface may report to the user a particular name and a particular identification number for an element of interest. In response to a nodes query, the single database may be searched for and the user interface may report to the user a particular node function of a particular translated script file. In response to a multi-nodes query, the single database may be searched for and the user interface may report to the user a plurality of node functions for a particular translated script file. In response to a chained-lines query, the single database may be searched for and the user interface may report a particular series of chained lines in a particular translated script file. In response to a path analysis query, a path analysis may be performed and the user interface may report the path analysis of an individual call flow in which all possible outcomes of a communication are determined from when the communication is initiated to when the communication is completed.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed herein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

FIG. 3 is an example of the coding language;

The Figures depict exemplary embodiments for purposes of illustration only. One skilled in the art will readily recognize from the following discussion that alternative embodiments of the systems and methods illustrated herein may be employed without departing from the principles of the technology described herein.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

The present technology may relate to, inter alia, systems and methods for translating graphical scripts into more useful forms. Broadly, certain embodiments of the present technology may provide a system and computer-implemented method for translating a coding language for a graphical script, such as are used in communication routing systems, into a more readily readable, searchable, and analyzable language. More particularly, embodiments may provide for accessing Unified Contact Center Enterprise (UCCE) scripting information, which may be stored in one or more databases and written in a language for which no schema is readily available, and translating the scripting information into a more useful format in order to facilitate analyzing a Contact Center environment.

In one implementation, an ICM Script Parsing utility receives raw *.ICS script files in bulk from one or more Cisco® ICM Databases, and processes them into more easily consumable (e.g., readable, searchable, and analyzable) eXtensible Markup Language (XML) files stored in a single database. The utility may also be configured to allow for searching these XML files for various user-definable search criteria in both ad-hoc and scheduled searches, and to produce outputs that can be both consumed through a User Interface and exported to third-party tools. Thus, for example, if a user desired to determine which of dozens of scripts across multiple Call Center systems invoke a particular destination, the user would simply have to search the XML database for the destination and would, in matter of minutes, receive a list of all scripts in all systems that invoke that destination. The present technology may also be used to make ICM scripts and their operation more broadly accessible to third-party automation tools.

Although described herein for illustration purposes as being adapted for use with a Cisco® ICM system, the present technology is adaptable for use with substantially any suitable ICM system, such as those provided by Rockwell and Nortel. Such adaptation may involve adapting the translation engine to the particular scripting language of the particular system. Further, although the preferred language is described herein as being XML, the preferred language may be substantially any suitable language such as JavaScript Object Notation (JSON) or YAML Ain't Markup Language (YAML).

Figure 1:
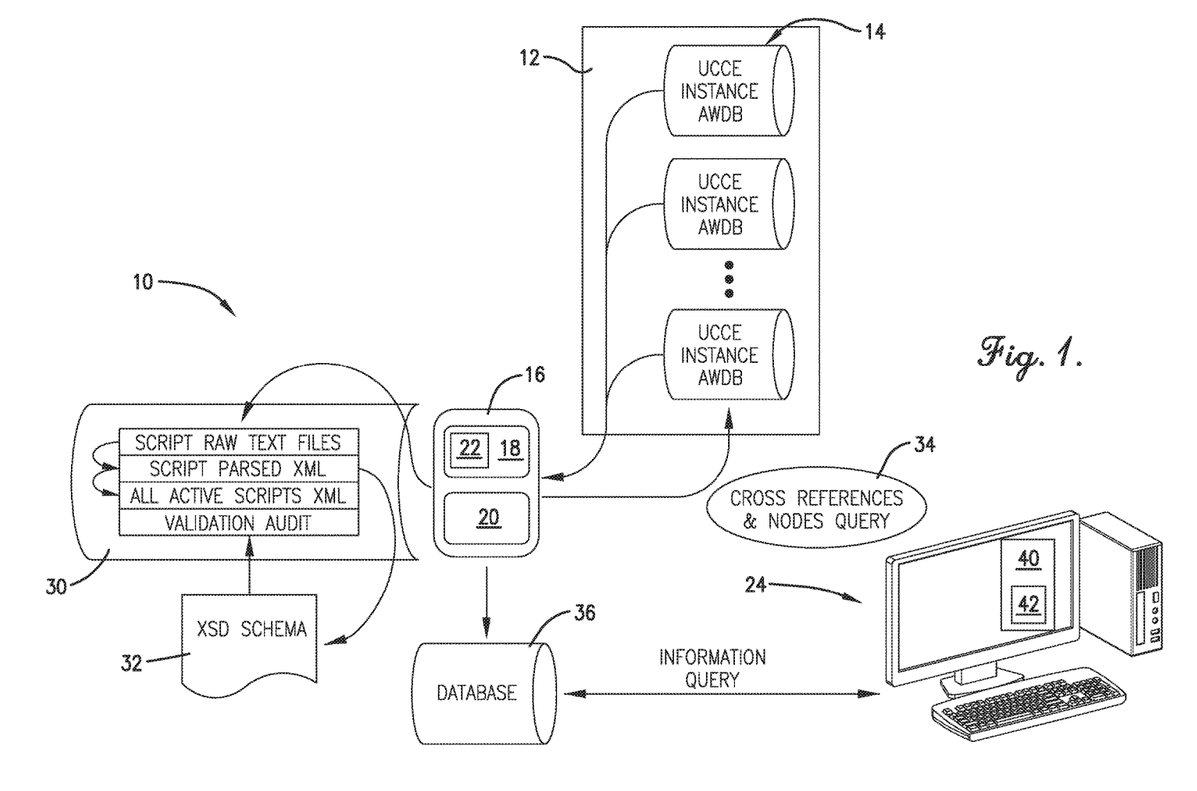
FIG. 1 is a block diagram of an embodiment of a system constructed in accordance with the present technology for improving a functioning of a communication routing system by translating a coding language for a plurality of graphical scripts used by the communication routing system into a preferred language.

Referring to FIG. 1, an embodiment of an exemplary system 10 is shown for translating a coding language underlying a graphic script, such as are used in communication routing systems, into a more readily readable, searchable, and analyzable language. The system 10 and an exemplary environment in which it may operate may broadly comprise an ICM system 12 including one or more UCCE databases 14; a computing device 16 including an electronic memory element 18 and an electronic processing element 20; a software element 22 which implements the functionality of the present technology; and one or more remote access device 24.

As mentioned, the ICM system 12 may be substantially any suitable call center system such as a Cisco® ICM system or, alternatively, one provided by Rockwell® or Nortel®. The one or more UCCE databases 14 may each be local Access Walker Databases (AWDBs) and contain a plurality of scripts for routing calls, with the scripts being readable in a graphical programming language with an underlying code for which no schema is provided.

The computing device 16 may be substantially any suitable computing device configured to perform the functionality described herein. The electronic memory element 18 may be configured to store the software element 22 which implements the functionality of the present technology along with any data needed or produced thereby, and the electronic processing element 20 may execute the software element 22. In more detail, the electronic memory element 18 may facilitate substantially any suitable form of data storage such as volatile, non-volatile, fixed, and/or removable memory, including read-only memory (ROM), electronic programmable read-only memory (EPROM), random access memory (RAM), erasable electronic programmable read-only memory (EEPROM), and/or other hard drives, flash memory, MicroSD cards, and others. Similarly, the electronic processing element 20 may employ substantially any suitable technology for performing its function.

The software element 22 may include a Translation Engine 30, an XSD Schema 32, a Cross-Reference and Nodes Query Function 34, and an XML Database 36. The Translation Engine 30 may include a Script Parsing Utility configured to receive a raw script file from the UCCE databases 14 containing a code, and apply a series of rules to translate the code from a less useful language into a more useful language, such as XML. The XSD Schema 32 may contain validation rules for guiding and validating the translation. For example, validation rules may include that a particular field should contain a certain number of characters, or that a particular field should be a date. Validation audits help to ensure valid results. The Cross-Reference and Nodes Query Function 34 may be configured to, once all of the script files are translated, query a cross-reference and nodes table contained in each of the UCCE databases 14 to gather contextual information useful in understanding and analyzing the translated script files. More specifically, the elements in scripts are identified by ID numbers, and the Cross-Reference Query Function 34 may associate a name with each ID number and store this information in the XML database 36 so it is more readable. The XML Database 36 may be configured to receive and store the translated scripts along with the associated contextual information.

The one or more remote access devices 24 may be in communication with the computing device 16 and may include a user interface 40 configured to facilitate a user accessing, searching, and otherwise using data stored in the XML database 36. The user interface 40 may provide one or more Search and Reporting Tools 42 to facilitate searching the XML Database 36 for and reporting particular information about the translated scripts. For example, the user interface 40 may include dozens or hundreds of selectable search criteria to allow for searching every component part of every node type. The user interface 40 may be configured to facilitate performing different types of queries, including a cross-reference query, a node query, and an XML files query. As mentioned, the Cross-Reference Query Function 34 may associate a name with each ID number and stores this information in the XML database 36. The cross-reference query from the user interface 40 may report the name and ID number for an element of interest. The nodes query from the user interface may allow for quickly determining the actual function of a specific script (e.g., step 1, step 2, . . . ).

Alternative or additional tools provided by the user interface 40 may include the following. One tool may allow the user to define searches or auditing rules to be run on individual node types on a scheduled or ad-hoc basis. Another tool may allow the user to define searches or auditing rules to be run on multi-node or multi-node-type conditions on a scheduled or ad-hoc basis. Another tool may display, in an exportable format, an inventory of all nodes contained within a single script along with specific information about each node and summary counts by node-type.

Figure 2:
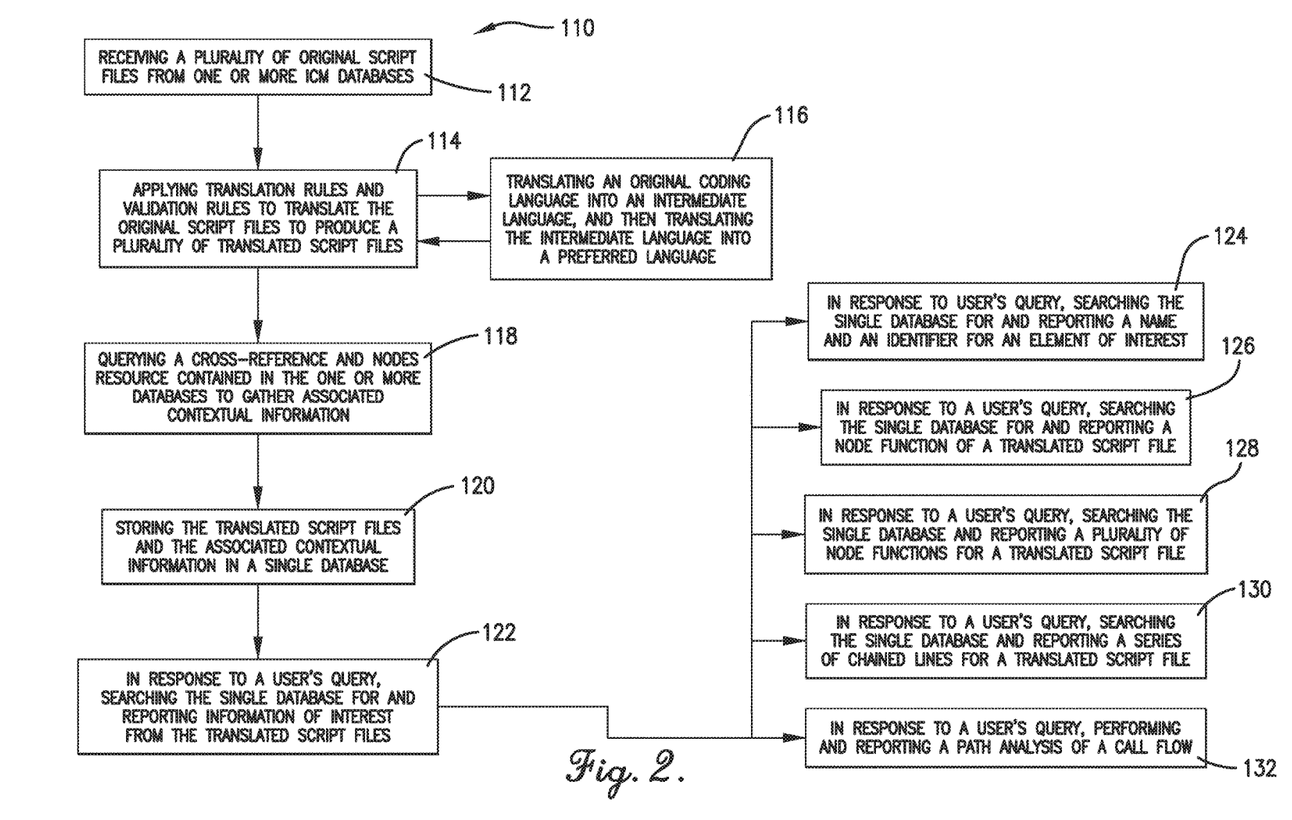
FIG. 2 is a flowchart of an embodiment of a computer-implemented method which may be implemented by the system of FIG. 1.

Referring also to FIG. 2, the system 10 may broadly function as follows. The processing element 20 may receive the plurality of original script files from the one or more databases 14, as shown in 112, and may apply a set of translation rules to translate the plurality of original script files and apply a set of validation rules for guiding and validating the translation from the coding language into the preferred language to produce a plurality of translated script files, as shown in 114. The processing element 20 may query a cross-reference and nodes resource contained in the one or more databases 14 to gather associated contextual information for understanding and analyzing the plurality of translated script files. The memory element 18 may store the plurality of translated script files and the associated contextual information may be stored in a single database 36. The user interface 40 may receive a query from a user, search the single database for information of interest from the plurality of script files, and report the information of interest to the user.

Thus, embodiments may create a repository for information about ICM scripts, with the data stored in a format that permits easy access by users and/or third-party tools for a wide variety of purposes, and may serve as a platform for a core suite of tools making use of the ICM script data.

The system 10 may include more, fewer, or alternative components and/or perform more, fewer, or alternative actions, including those discussed elsewhere herein, and particularly those discussed in the following section describing the computer-implemented method.

Referring again to FIG. 2, an embodiment of computer-implemented method 110 is shown for improving a functioning of a communication routing system by translating a coding language for a plurality of graphical scripts used by the communication routing system into a preferred language. As mentioned, the communication routing system may be an ICM used to route telephone calls. The computer-implemented method 110 may be a corollary to the functionality of the system 10 of FIG. 1, and may be similarly implemented using the various components of the system 10 within the above-described exemplary operating environment. In particular, many actions may be performed or facilitated by the software element 22, or separate sub-modules of the software element 22, stored in the memory element 26 and executed by the processing element 20, and other actions may be facilitated by the user interface 40. Broadly, the method 110 may proceed as follows.

A plurality of original script files may be collected or otherwise received from the one or more databases 14 of the ICM system 12, as shown in 112. Collection methods may include automatic and manual methods. In particular, the automatic method may routinely pull active routing scripts, while the manual "on-demand" method may pull inactive or recently updated scripts. In one implementation, once each day (e.g., overnight) the currently active versions of ICM scripts may be reviewed and any active scripts not previously received may be processed. Additionally, any active versions of the script that have a number higher than the current version of the script may be processed. Script files may have an Information Section, a Cross-Reference Section, and a Body Section. If a new active version of a script previously received is discovered, the Information Section element <isActive> may be marked "false" for each of the previous versions of the MasterScriptID in the file. The script file may be stored in a Script_Data table in a particular one of the one or more databases 14, in a column called "ScriptData." Typically, there may only be one row (RowOrder) for each script, but extremely long scripts may be broken out into multiple rows. The lowest number row may be processed first, and when combined together they make a full file. In one implemented, due to performance issues (over one minute to populate PIC7 data), joining to the Script_Data table may wait until the desired scriptIDs have been identified to read into the system. The system may retain several copies of each Master Script. The oldest file previously received may be dropped first. The Active Version of a script may never be dropped.

A set of translation rules may be applied to translate the plurality of original script files, and a set of validation rules may be applied for guiding and validating the translation from the coding language into the preferred language to produce a plurality of translated script files, as shown in 114. For example, each original script file may include one or more fields, and the set of validation rules may include a first rule regarding a number of characters in each field, and a second rule regarding a nature of each field. The set of translation rules and/or the set of validation rule may be created by substantially any suitable process, such as by reverse engineering the coding language by systematically deleting and/or replacing portions of the original script files, observing the results, and inferring the meanings of those portions from the results.

Figure 4:
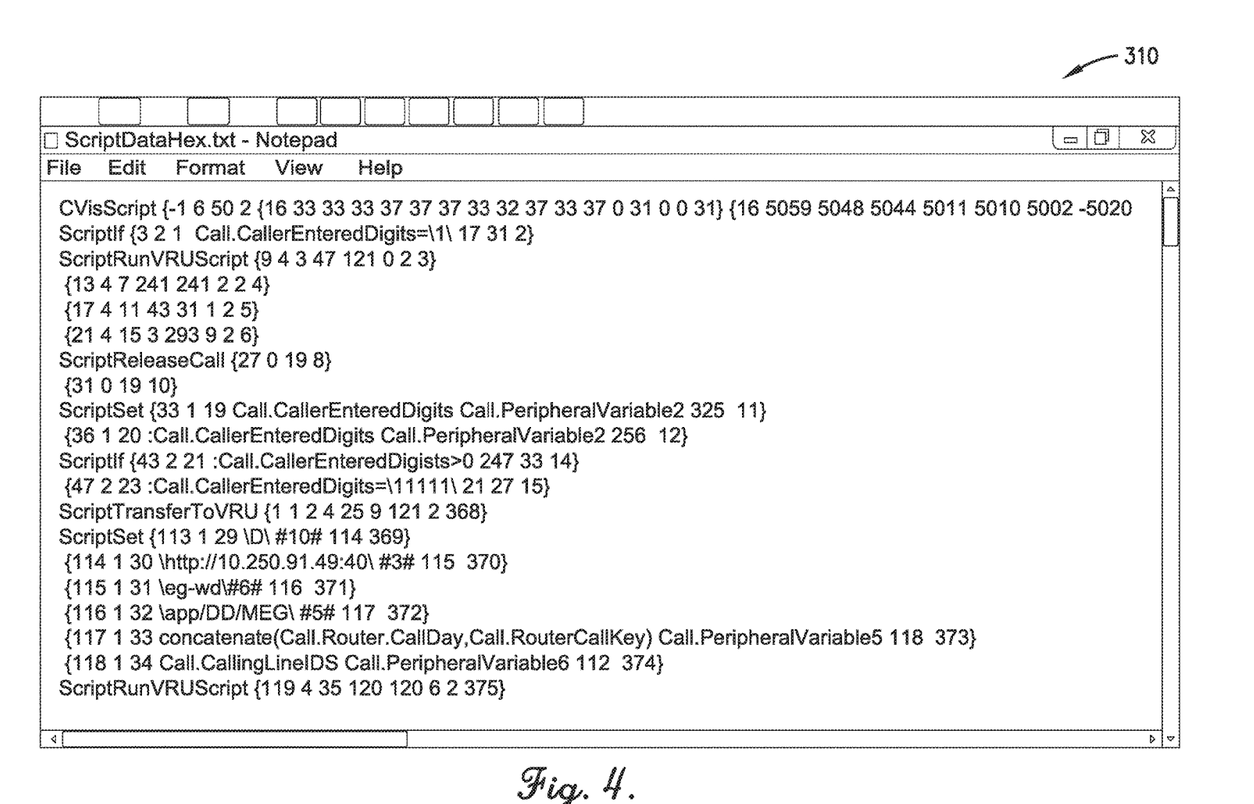
FIG. 4 is an example of the coding language translated into an intermediate language.
Figure 5:
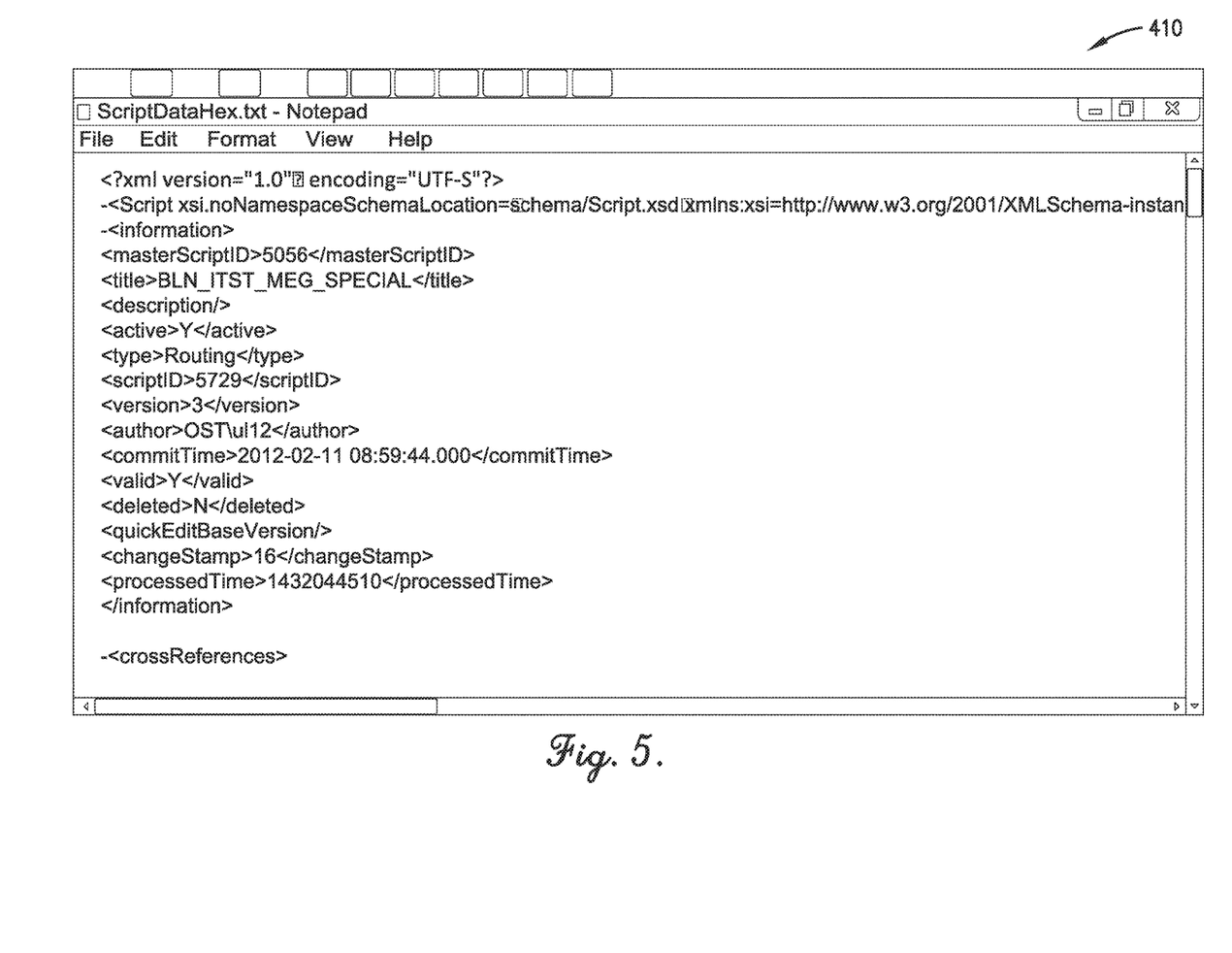
FIG. 5 is an example of the intermediate language translated into the preferred language.

In one implementation, the coding language 210 (a hex format example of which is depicted in FIG. 3) may be translated into an intermediate language 310 (an ASCII format example of which is depicted in FIG. 4), and the intermediate language may be translated into the preferred language 410 (an XML format example of which is depicted in FIG. 5), as shown in 116.

A cross-reference and nodes resource (e.g., one or more tables) contained in the one or more databases 14 may be queried to gather associated contextual information for understanding and analyzing the plurality of translated script files, as shown in 118. For example, each original script file may include one or more elements, and each element may have an identification number, and the cross-reference and nodes resource may associate a name with each identification number, and the associated contextual information may include the name and the identification number for each element.

As mentioned, script files may have an Information Section, a Cross-Reference Section, and a Body Section. For each script, data in the Information Section may be pulled from a particular one of the one or more databases 14 in order to provide context about the script that is being processed. All data in this section may be contained within an <information> tag. The Cross-Reference Section may define the referenced database targets that are used in the script. While it is defined in the script, it is also defined in the database, which may be easier to reference. When these targets are used by nodes in the script, each value may be referenced using the logic #3# where the number represents localID. The Body Section may be the main section of the script and may contain a series of <node> elements which define the information about each separate node in the script.

The code for processing script files may be written in a sufficiently modular manner to accommodate changes to the number of variables and new node types as the communication routing system 12 evolves over time.

The plurality of translated script files and the associated contextual information may be stored in a single database 36, as shown in 120. In response to a query from a user via the user interface 40, the single database 36 may be searched for information of interest from the plurality of translated script files, and the information of interest may be reported to the user, as shown in 122.

Various example queries and other useful functions may include the following. In response to a cross-reference query from the user, the single database 36 may be searched for and a particular name and a particular identification number for an element of interest may be reported, as shown on 124. In response to a nodes query from the user, the single database 36 may be searched for and a particular node function of a particular translated script file may be reported, as shown in 126. Relatedly, in response to a multi-nodes query from the user, the single database 36 may be searched for and a plurality of node functions for the particular translated script file may be reported, as shown in 128. In response to a chained-lines query from the user, the single database 36 may be searched for and a particular series of chained lines for a particular translated script file may be reported, as shown on 130. In response to a path analysis query from the user, a path analysis of an individual call flow maybe performed and reported in which all possible outcomes of a communication are determined from when the communication is initiated to when the communication is completed, as shown in 132.

The computer-implemented method 110 may include more, fewer, or alternative actions, including those discussed elsewhere herein.

The present technology and the information it provides may be put to substantially any suitable use, such as the following exemplary application embodiments. The Path Analysis Tool application, mentioned above, may include the following. An embodiment may be configured to facilitate performing a complete path analysis of individual call flows. Given a dialed number, all possible outcomes of the call can be determined from the time the user dials until the user is delivered to a representative or disconnects. Existing tools do not provide this functionality. This embodiment allows for determining not only where scripting failures could impact infrastructure availability (loops), but also where basic business logic rules may be violated, such as "don't send a call back where it just came from." Additionally, this allows standards entities and policyholder experience groups to analyze all possible experiences the policyholder may experience and determine if all possible paths meet the standards set out by the enterprise. Technological and business examples of experiences that could be examined include results in a loop, queues to the same resource two or more times, never queues, terminates without treatment (queue, label, end, release, announcement, etc.), infinite path (3,500 non-loop nodes before an exit condition), repetition of resources (hearing quality assurance (QA) more than once, hearing same menu twice, etc.), queue to more than 10 skills in a single call flow, violations of customer experience standards that may only be present on one specific path in a call flow, exits and re-enters the same point-in-call (PIC) during a single call flow, and/or departs off-net only to re-enter an on-net destination. Integration with third party data sources (e.g., a data aggregator and database) may include analysis for loop conditions where the call exits the UCCE environment only to find a path that would result in it reporting to UCCE (such as a voicemail zero out back to a UCCE script), thereby continuing the call flow.

A Monitoring Triggered Automated Actions application may include the following. If a specific syslog message is triggered from the ICM or Customer Voice Portal (CVP), an embodiment may be configured to trigger a scripted analysis action or actions and record and/or deliver to a third-party tool the results of that analysis.

An Unused/Orphaned Asset Lists application may include the following. An embodiment may be configured to search through some or all enterprise scripts for specific nodes, configurations, etc. that may not be part of a cross-referenced object in the database (e.g., Media Files. These findings may then be compared to the location the object is stored in (other databases, media servers, etc.) and an orphaned object reports may be generated for use by scripting teams during environment cleanup.

A Call Flow Diagram Creation application may include the following. Currently, application developers use Visio or similar tools to create documents such as call flow documents for each ICM script that is deployed to production. Maintenance of these documents is challenging and time consuming. Often minor changes or those made outside of normal activities (such as changes made during troubleshooting) are not reflected in the Visio documents, which eventually renders each document ineffective without major work to bring them back up to date. An embodiment may be configured to dynamically generate such documents based on active call flow versions or versions under development, thereby reducing the time required for deployment while increasing the quality of the deployed product.

An Expanded Location Based Reporting application may include the following. An embodiment may be configured to combine data generated by the present technology with data from a dial plan management tool and Splunk, thereby increasing the ability to report on UCCE assets utilized by specific geographic locations rather than being limited to line of business.

A Plain Language Call Flow Explanations application may include the following. By developing a "business syntax" guide for each node, it is possible to create a "business language/plain language" expression of what is occurring inside individual scripts or entire call flows. This may be more easily consumed by business partners than the current Visio diagrams and other methods being used.

An Expanded Dial Plan Management Tool Context application may include the following. An embodiment may be configured to deeply analyze specific activities in scripts (e.g., call types used, media files referenced, skills referenced, etc.), thereby increasing the accuracy and granularity of the dial plan management tool's ability to determine the line of business that "owns" a specific toll-free, direct inward dialing (DID), or non-DID line.

A Transfer Reports application may include the following. An embodiment may be configured to examine requalify, go-to, and label nodes, as well as other node types, and based thereon, develop a report listing all of the destinations to which a script, line of business, or other construct transfers calls.

A Scripting Code Validation application may include the following. An embodiment may be configured to run newly created scripts through the auditing engine prior to the code being deployed to production or being moved between environments, thereby verifying even inactive versions of scripts before customers interact with them.

A Business Language Call Trace Utility may include the following. The current ICM call trace utility asks the technician to set the specific values of the call (from/to, caller-entered-digits (CED)), then reads back all the nodes callers experience in pseudocode which is only understandable to developers (using the call volume/agent level metrics happening at the moment they start the process). An embodiment may be configured to apply paraphrasing and logic rules to create a business-partner call trace tool that allows them to enter specific parameters (including call volume/agent metrics) and see what the end-users would experience. The results may be communicated in common language, such as "Menu→30 Seconds Music→Queue to Skill A→Loop hearing XYZ until representative available (likely 22 second)→Deliver to representative 'Corey'."

A Call Analysis Engine application may include the following. An embodiment may be configured to integrate several data sources, call records, CVP logs, and possibly post-call survey results, to determine where a caller exited from the call flow and trace their call back from its exit point through its entire call path. In effect, this is the Path Analysis Tool employed in reverse. From the final node, and by capturing current call center conditions at the time of the call, a node-for-node walkthrough may be presented of the experience a customer would have had within the ICM system, including likely hold times, messages heard, etc. This allows technical teams to understand how call center designs impact post-call survey results, and permit business teams to determine with greater clarity the experiences that may have been referenced in any survey results. Additionally, an analysis may be included of the specific infrastructure hardware that was encountered during a user's call, and any impacts may be identified that may have been registered by the hardware at the time of the policyholder's call.

A Customer Abandon Analysis application may include the following. An embodiment may capture known "failure" calls from termination call detail (TCD)/route call detail (RCD), such as abandoned or disconnected callers (i.e., callers who choose to end their call, not callers who were dropped), and then the exact path they would have taken from initial entry to their departure may be determined. Using this new knowledge, this "failed customer experience" can be examined from the perspective of improving customer experience, including things issues as "how many menus did they hear," "how many announcements did they hear," "did they hear marketing messages," "did their menus include zero out options," "did they hear a QA message," "how much passive listening occurred versus active action taken during the call flow," etc.

A Modification of Scripts application may include the following. Once the code underlying a particular script has been translated, an embodiment may allow for modifying the script by introducing the modification in the preferred language, reverse-translating it back into the original coding language, and then overwriting the original script in the one or more databases 14 with the modified script.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A computer-implemented method for improving a functioning of a communication routing system by translating a coding language for a plurality of graphical scripts used by the communication routing system into a preferred language, wherein the communication routing system includes one or more databases containing a plurality of original script files, the computer-implemented method being implemented by a computing device and comprising:

receiving the plurality of original script files from the one or more databases;

applying a set of translation rules to translate the plurality of original script files and applying a set of validation rules for guiding and validating the translation from the coding language into the preferred language to produce a plurality of translated script files;

querying a cross-reference and nodes resource contained in the one or more databases to gather associated contextual information for understanding and analyzing the plurality of translated script files;

storing the plurality of translated script files and the associated contextual information in a single database; and     in response to a query from a user via a user interface, searching the single database for information of interest from the plurality of translated script files, and reporting the information of interest to the user.

2. The computer-implemented method of claim 1, wherein the communication routing system is an intelligent contact management system used to route telephone calls.

3. The computer-implemented method of claim 1, wherein the coding language is translated into an intermediate language; and the intermediate language is translated into the preferred language.

4. The computer-implemented method of claim 1, wherein each original script file includes one or more fields, and the set of validation rules include a first rule regarding a number of characters in each field; and a second rule regarding a nature of each field.

5. The computer-implemented method of claim 1, wherein each original script file includes one or more elements, and each element has an identification number, and the cross-reference and nodes resource associates a name with each identification number, and the associated contextual information includes the name and the identification number for each element.

6. The computer-implemented method of claim 5, further including in response to a cross-reference query from the user via the user interface, searching the single database for and reporting a particular name and a particular identification number for an element of interest.

7. The computer-implemented method of claim 1, further including in response to a nodes query from the user via the user interface, searching the single database for and reporting a particular node function of a particular translated script file.

8. The computer-implemented method of claim 7, further including in response to a multi-nodes query from the user via the user interface, searching the single database for and reporting a plurality of node functions for the particular translated script file.

9. The computer-implemented method of claim 1, further including in response to a chained-lines query from the user via the user interface, searching the single database for and reporting a particular series of chained lines for a particular translated script file.

10. The computer-implemented method of claim 1, further including in response to a path analysis query from the user via the user interface, performing and reporting a path analysis of an individual call flow in which all possible outcomes of a communication are determined from when the communication is initiated to when the communication is completed.

11. A computer-implemented method for improving a functioning of an intelligent contact management system by translating a coding language for a plurality of graphical scripts used by the intelligent contact management system into a preferred language, wherein the intelligent contact management system includes one or more databases containing a plurality of original script files for routing telephone calls, the computer-implemented method being implemented by a computing device and comprising:

receiving the plurality of original script files from the one or more databases;

applying a set of translation rules to translate the plurality of original script files and applying a set of validation rules for guiding and validating the translation from the coding language into an intermediate language, and from the intermediate language into the preferred language to produce a plurality of translated script files;

querying a cross-reference and nodes resource contained in the one or more databases to gather associated contextual information for understanding and analyzing the plurality of translated script files;

storing the plurality of translated script files and the associated contextual information in a single database;

in response to a query from a user via a user interface, searching the single database for information of interest from the plurality of translated script files, and reporting the information of interest to the user; and     in response to a path analysis query from the user via the user interface, performing and reporting a path analysis of an individual call flow in which all possible outcomes of a particular telephone call are determined from when the particular telephone call is initiated to when the particular telephone call is completed.

12. A system for improving a functioning of a communication routing system by translating a coding language for a plurality of graphical scripts used by the communication routing system into a preferred language, wherein the communication routing system includes one or more databases containing a plurality of original script files, the system comprising:

an electronic memory; a computing device configured to:

receive the plurality of original script files from the one or more databases, apply a set of translation rules to translate the plurality of original script files and applying a set of validation rules for guiding and validating the translation from the coding language into the preferred language to produce a plurality of translated script files,     query a cross-reference and nodes resource contained in the one or more databases to gather associated contextual information for understanding and analyzing the plurality of translated script files,     store the plurality of translated script files and the associated contextual information in a single database in the electronic memory; and     a user interface configured to receive a query from a user, search the single database for information of interest from the plurality of translated script files, and report the information of interest to the user.

13. The system of claim 12, wherein the coding language is translated into an intermediate language; and the intermediate language is translated into the preferred language.

14. The system of claim 12, wherein each original script file includes one or more fields, and the set of validation rules include a first rule regarding a number of characters in each field; and a second rule regarding a nature of each field.

15. The system of claim 12, wherein each original script file includes one or more elements, and each element has an identification number, and the cross-reference and nodes resource associates a name with each identification number, and the associated contextual information includes the name and the identification number for each element.

16. The system of claim 15, further including in response to a cross-reference query from the user via the user interface, searching the single database for and reporting a particular name and a particular identification number for an element of interest.

17. The system of claim 12, further including in response to a nodes query from the user via the user interface, searching the single database for and reporting a particular node function of a particular script file.

18. The system of claim 17, further including in response to a multi-nodes query from the user via the user interface, searching the single database for and reporting a plurality of node functions for the particular script file.

19. The system of claim 12, further including in response to a chained-lines query from the user via the user interface, searching the single database for and reporting a particular series of chained lines in the script file.

20. The system of claim 12, further including in response to a path analysis query from the user via the user interface, performing and reporting a path analysis of an individual call flow in which all possible outcomes of a communication are determined from when the communication is initiated to when the communication is completed.

\* \* \* \* \*